United States Patent [19]

Kalbfeld

[11] Patent Number: 4,640,984
[45] Date of Patent: Feb. 3, 1987

[54] SUPPORT AND STRAIN RELIEF COMBINATION

[75] Inventor: Jack W. Kalbfeld, Melville, N.Y.

[73] Assignee: Union Connector Co., Inc., Roosevelt, N.Y.

[21] Appl. No.: 637,200

[22] Filed: Aug. 2, 1984

[51] Int. Cl.[4] ............................................. H01R 13/58
[52] U.S. Cl. ............................... 174/135; 174/153 G; 339/107
[58] Field of Search .............. 248/56; 339/103 B, 107, 339/103 R, 103 C; 174/65 G, 135, 153 G

[56] References Cited

U.S. PATENT DOCUMENTS

| | | | |
|---|---|---|---|
| 2,563,604 | 8/1951 | Hultgren | 174/153 G |
| 2,930,840 | 3/1960 | Klumpp, Jr. | 174/153 G |
| 3,249,687 | 5/1966 | Klumpp, Jr. | 174/153 G |
| 3,424,856 | 1/1969 | Coldren | 174/153 G |
| 3,784,961 | 1/1974 | Gartland, Jr. | 339/107 |
| 4,162,561 | 7/1979 | Tillemans | 174/135 X |
| 4,289,923 | 9/1981 | Ebert | 174/153 G X |
| 4,493,467 | 1/1985 | Borja | 174/153 G X |

Primary Examiner—Laramie E. Askin
Attorney, Agent, or Firm—William A. Drucker

[57] ABSTRACT

A strain relief for holding a cable or a plurality of wires against movement relative to a support, such as a multipart connector or a panel having a hole through which they are passed, has a deformable body advantageously of elastomer and including first and second portions preferably coupled by a strap, the first portion having two spaced ribs with a trough defined between them, the second portion having a base with a transverse wall upstanding on it, the ribs and the wall being disposable such that the cable or plurality of wires are abutted by the ribs, and by the wall between the ribs, and are gripped frictionally and forced into a U-shaped bend, which anchors them against twisting and longitudinal movement relative to the support.

1 Claim, 15 Drawing Figures

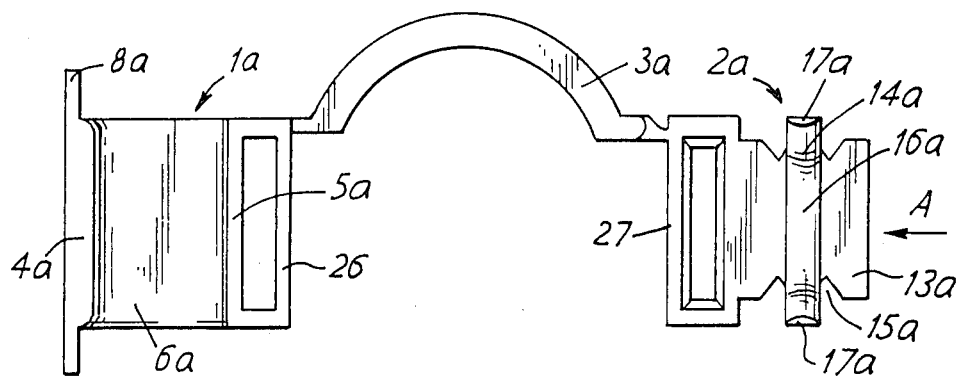
FIG. 6
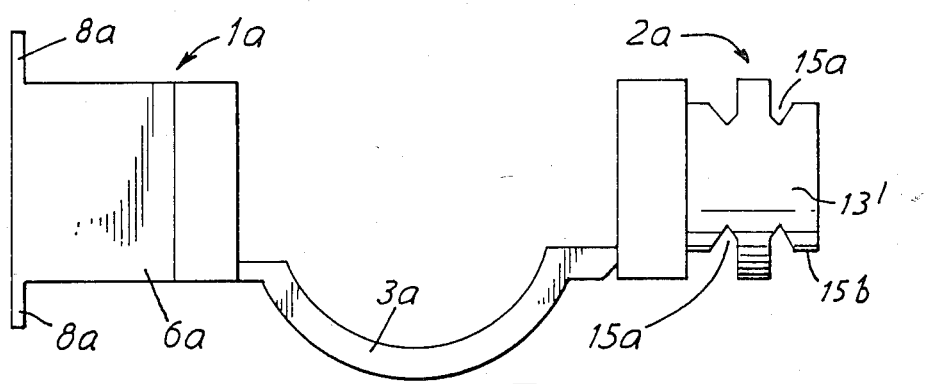
FIG. 7
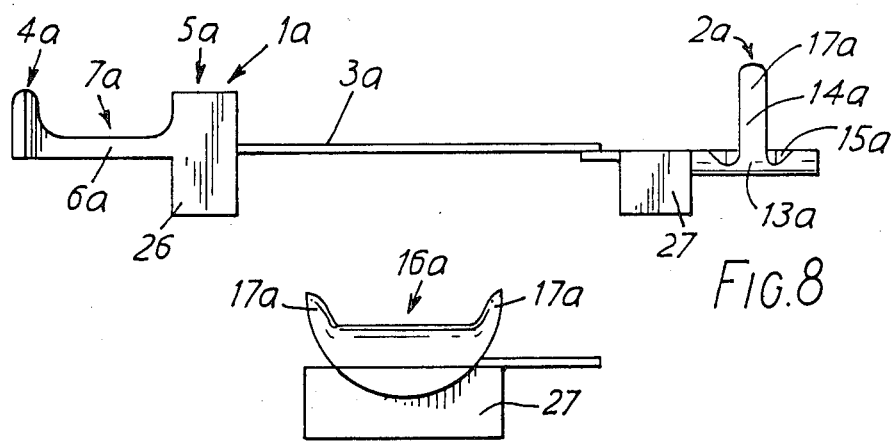
FIG. 8
FIG. 9

4,640,984

1

SUPPORT AND STRAIN RELIEF COMBINATION

BACKGROUND OF THE INVENTION

The term "strain relief" is used in the electric and electronic arts to define a class of articles which are used for the protection of ligaments, usually single cables or multiple wires, where those items pass into or through a relatively fixed support, the purpose being to provide an anchorage of the item with respect to the support and especially to eradicate the effect of small-radius flexing, pulling, pushing and twisting (about its own axis) of the item with respect to the support. Thus, primarily the function of a strain relief can be one- or two-fold, i.e. the prevention of transmission of mechanical force to the electrical connector by tension or torque, or by compression and torque. A common use for cable strain reliefs is where a cable passes into a multi-piece connector. It is obviously desirable that a strain relief may be capable of being fitted about the item to be protected, as distinct from having to be strung along the item from an end thereof, and many examples are known in the art of strain reliefs which comprise a body having an axial opening to receive the item through it, the body having a first part largely embracing the item, and a second part which can be engaged to fill a radial gap in the first part to complete the embrace of the body about the item. It is common in the art to have the two parts joined by a flexible strap.

OBJECT OF THE INVENTION

It is the main object of the invention to provide an improved strain relief particularly adapted to the protection and securement of a cable, or of a number of wires disposed side by side, where they pass through an opening in a support, the cable or wires as a whole being either unsheathed, in which event the strain relief has on its surface male protrusions adapted to provide a keying effect, or sheathed in a common flexible enclosure such as a tube or wrapping of glass fiber adapted to provide a keying effect.

Another object of the invention is to provide an improved strain relief which is applicable to a range of wire diameters.

SUMMARY OF THE INVENTION

According to the present invention there is provided a strain relief comprising a body of a resiliently deformable material including a first portion and a second portion preferably coupled by a strap, said first portion having two elongated ribs spaced apart in the direction of intended application to a plurality of wires disposed side by side, said ribs defining between them a trough, said second portion having a base elongated in the direction of the wires and a transverse wall upstanding intermediate the ends of the base, whereby a cable or a plurality of wires disposed between the first portion and the second portion and abutted under pressure by said ribs and said wall are forced into a U-shaped bend and are tightly held by friction against movement relative to the strain relief.

In a preferred construction, the first portion includes lug means extending at least at one lateral side for abutment when in use against major surfaces of a support having an opening in which the strain relief is engaged.

2

The strain relief may conveniently be manufactured as an integral whole by molding from an elastomeric material.

BRIEF DESCRIPTION OF THE DRAWINGS

Two presently preferred embodiments of strain relief, and a support therefor, in accordance with the invention are hereinafter particularly described with reference to the figures of the accompanying drawings.

In the drawings:

FIG. 6 is a plan view of a second embodiment of strain relief in rest (open) condition;

FIG. 7 is an underplan view of the strain relief of FIG. 6;

FIG. 8 is a side elevation of the strain relief of FIG. 6;

FIG. 9 is an end elevation of the strain relief of FIG. 6, viewed in the direction of the arrow "A" in FIG. 6;

DESCRIPTION OF THE PREFERRED EMBODIMENTS

Figure 1:
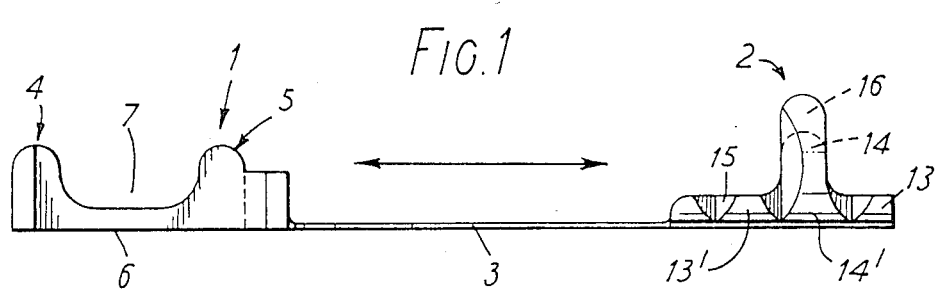
FIG. 1 is a side elevation of a first embodiment of strain relief, seen in the rest (open) condition.

Referring to FIGS. 1 to 5, the first embodiment of strain relief comprises a body made as an integral whole of a resiliently deformable plastic or elastomeric substance, e.g. by molding. The body comprises a first portion 1 (hereinafter referred to for convenience as the "main" portion), and a second portion 2 (hereinafter referred to as the "auxiliary" portion) joined together by a flexible laterally bowed strap 3. The direction of laying of the wires in relation to the body is shown by the double-headed arrow in FIG. 1.

The main portion 1 comprises a first elongated rib 4 and a second parallel elongated rib 5 spaced from the first rib by a web 6. Between the two ribs 4,5 and above the web 6, there is defined a trough 7. The rib 4 is extended at both ends by small lugs 8,8. Adjacent to, but beyond, the rib 5 there are provided two similar small lugs 9,9. The lugs 8,8 and 9,9 project laterally from the main portion 1, and thus bound a gap 10,10 at each side. When the strain relief is eventually fully engaged into a hole 11 in a two-part connector 12, shown in broken line in FIG. 2, the lugs 8,8 and 9,9 abut the respective major surfaces of the connector and prevent the strain relief from passing out of the hole 11.

The auxiliary portion 2 comprises a base 13 elongated in the direction of the wires and joined to the strap 3, and an elongated transverse wall 14 disposed intermediate the ends of the base. The base 13 is plane on its upper face (in FIG. 1) but is curved at least at the edges as at $13^1$ on its lower face in FIG. 1. A plurality of V-shaped recesses 15 are formed in the longitudinal edges of the base 13. The purpose of the recesses 15 is explained in relation to FIGS. 6–15 later herein. The wall 14 is cut away at its upper face (in FIG. 1) remote from the base 13, to provide an elongated recess 16 bounded at each end by an upstanding portion 17,17. The wall 14 as a whole is arcuate at a surface $14^1$ which extends through about 180°. The elongation of the ribs 4,5 and the wall 14 is at least the dimension of the wires laid side by side.

Figure 4:
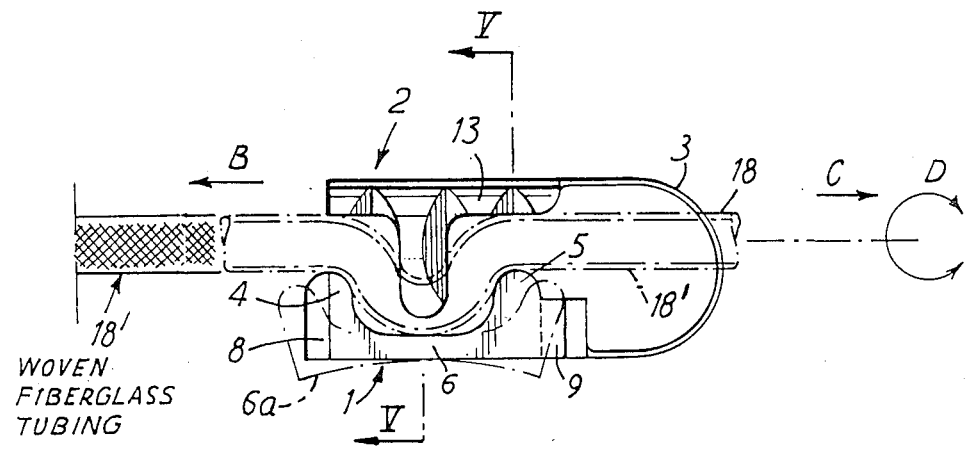
FIG. 4 is a side elevation of the strain relief of FIG. 1 when in folded working condition, embracing and gripping a plurality of wires placed side by side.
Figure 5:
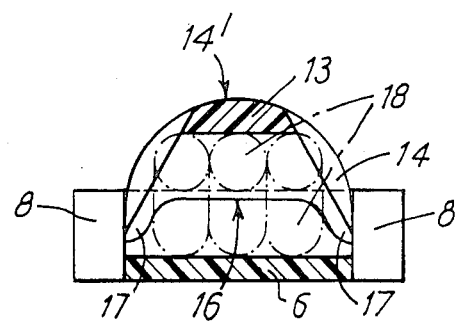
FIG. 5 is a section taken on the stepped line V—V of FIG. 4.

In use, a plurality (in this case, three) of wires or cables 18 are disposed side by side, see FIG. 5, so as to overlie the ribs 4 and 5 of the main portion 1. Then the auxiliary portion 2 is moved through 180° from the position of FIG. 1 into a working position in which the wall 14 overlies the trough 7 substantially midway between the ribs 4 and 5, with the wires positioned side by side in the recess 16. The auxiliary portion 2 is forced "home" relative to the main portion 1, e.g. by screwing together parts of a two-part connector, until the wires 18 have been tightly gripped frictionally and have been constrained by the ribs 4,5 and the wall 14 to adopt the U-curve seen in FIG. 4. As described later, to increase friction the wires 18 may be enclosed in a sheath $18^1$ such as a fiberglass sheath, but the arrangement and operation are the same. With the wires gripped in the manner indicated in FIG. 4, the wires are tightly held against pulling in the directions of the arrows "B" and "C" and the grip is tight enough to ensure that the wires cannot ride one over another due to any rotation imparted to the bundle of wires in the direction of the arrow "D".

When the wires, and the strain relief applied thereon in the manner indicated in FIG. 4, have been engaged in the hole 11 of the connector 12, the main portion 1 and the auxiliary portion 2 are retained in that condition by abutment with the internal face of the hole 11. In practice, the main portion 1 may adopt a somewhat curved stance, due to abutment with the arcuate internal face of the hole 11, and the auxiliary portion 2 is even more tightly secured by engagement of the keying ribs 15b, bounded by the V-cuts 15 (see FIG. 10 and the description later herein of the recesses 15a), abutting portions such as ribs (not shown) on the internal face of the hole 11.

The strain relief of the present invention can provide a degree of self-adjustment to varied thicknesses of wires or cable with which it is engaged. Referring to FIG. 4 of the drawings, it will be seen that the wires 18 are squeezed between the main portion 1 and the auxiliary portion 2 at five places. These are:

(i) in the vertical space between the rib 4 and the flat surface on base 13;

(ii) in the vertical space between the rib 5 and the flat surface on base 13;

(iii) in the vertical space between the top of the transverse wall 14 and the web 6;

(iv) in the diagonal or close-to-horizontal space between the rib 4 and the wall 14, and (v) in the diagonal or close-to-horizontal space between the rib 5 and the wall 14.

The vertical spaces of (i), (ii) and (iii) are directly controlled by the extent to which the two parts of the connector, in which the strain relief is fitted, are tightened towards each other. It is desirable further to make provision for the diagonal spaces of (iv) and (v) to be correspondingly controlled. For this purpose, in accordance with a further feature of the invention, the web 6 is made resiliently flexible, e.g. able to assume the position shown in broken line in FIG. 4 at 6a, so that the width of (iv) and (v) can enlarge to accommodate a thicker wire. The two parts of the connector are then tightened towards each other, and this has the effect of not only reducing (i), (ii) and (iii) proportionately, but also of reducing the flexing of web 6 and thus also reducing (iv) and (v) proportionately. The strain relief thus has a property of being self-adjusting to different thicknesses of wire, within limits. For the same purpose, the wall 14 may likewise be resiliently deformed, to a somewhat flattened shape of less vertical height and greater width.

Figure 2:
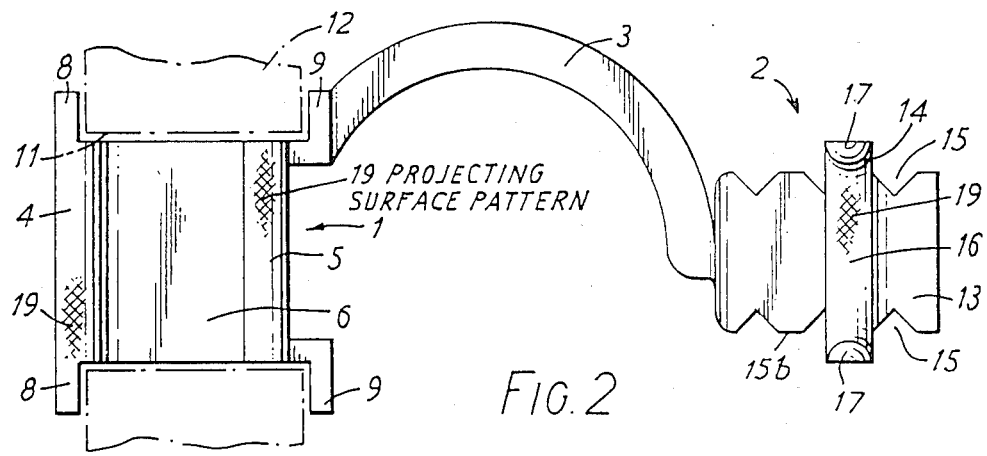
FIG. 2 is a plan view of the strain relief of FIG. 1.
Figure 3:
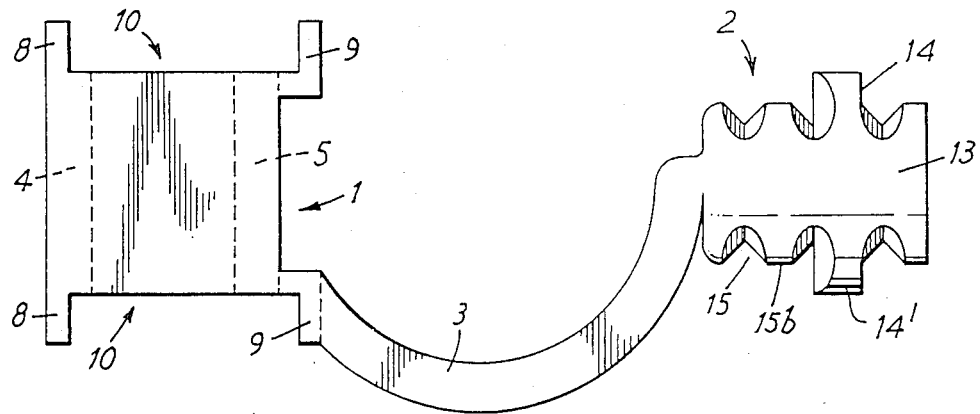
FIG. 3 is an underplan view of the strain relief of FIG. 1.

The strain relief of the present invention is of particular use in the holding of Teflon-insulated wire. Teflon-covered wire is very difficult to hold onto, because of its self-lubricating and slippery qualities. Certain plastic materials have cold flow properties. In a further aspect of the invention, the plastic-coated wire or wires are encased inside a woven fiberglass tube. When the two portions of the strain relief are clamped together, the pressure created is sufficient to squeeze the woven fiberglass tube very tightly onto the Teflon-covered wire. The longer the assembly remains in this condition, the better are the chances of the Teflon exhibiting cold flow. The result of this, which can be ascertained by disassembly, after a period of time, is that there is an imprint of the woven fiberglass pattern on the surface of the Teflon coating. Thus, there is then no longer a slippery Teflon-covered wire readily slidable between the two portions of the strain relief. In effect, the Teflon-coating has a very large amount of extremely fine teeth, of the fiberglass, embedded into its outer surface layer. This greatly increases the static friction. There is also filling of interstices, on the surface of the Teflon, by male projections of the surface of the woven fiberglass tubing. The result of this is that, if a longitudinal pull is exerted on the wire(s) there will come a point at which the wire will eventually slip, relative to the strain relief, and will then readily slide out. However, this point is only reached where the longitudinal pull exceeds the breakout friction, the latter being determined very largely by the interaction between the surfaces of the Teflon and the woven fiberglass tube. Clearly, the breakout friction rises as the extent of cold flow rises, and this is true with other coating materials besides Teflon. A very common insulating material for wires is rubber or vinyl plastics. The vinyl plastics have cold flow properties.

Where the strain relief is to be used without the intermediate woven fiberglass tubing about the wire(s), the same effect can be obtained if a projecting surface relief pattern is provided on at least one of the portions of the strain relief itself, e.g. as indicated at 19 in FIG. 2. This can have a similar effect of imprinting, with time, a similar pattern on the insulation of the wire, as a result of cold flow, and thus again considerably increasing the breakout friction.

Referring now to FIGS. 6 to 15 there is described a second embodiment of strain relief and its manner of assembly with a two-part connector for the gripping of a cable or plurality of wires.

Figure 13:
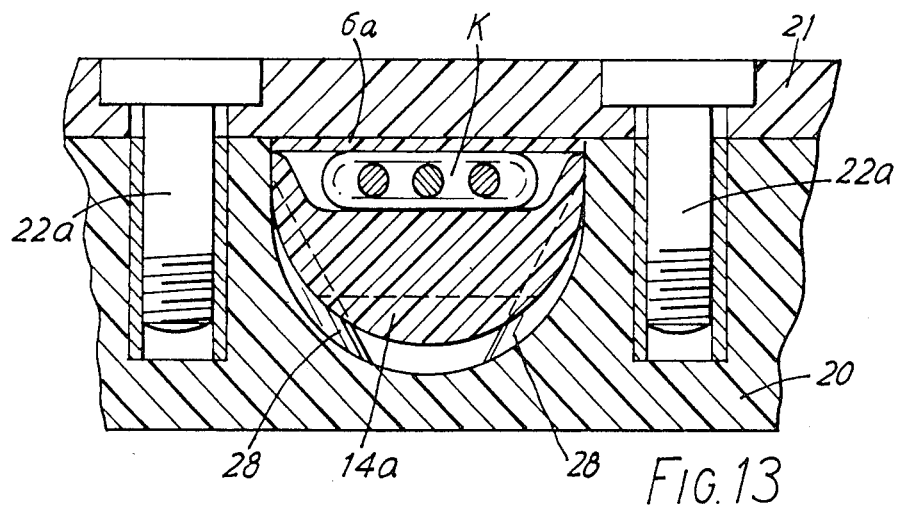
FIG. 13 is a vertical transverse section, taken at a position corresponding to the line XIII—XIII in FIGS. 12 and 14, of the strain relief embracing and gripping a three-core cable and clamped within the assembled two-part connector.
Figure 14:
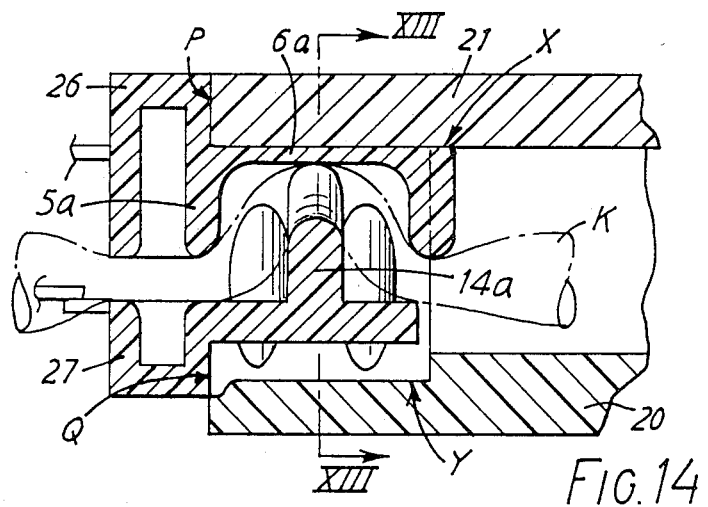
FIG. 14 is a partial vertical longitudinal section, taken at a position corresponding to the line XIV—XIV in FIG. 12, of the assembled items of FIG. 13.
Figure 15:
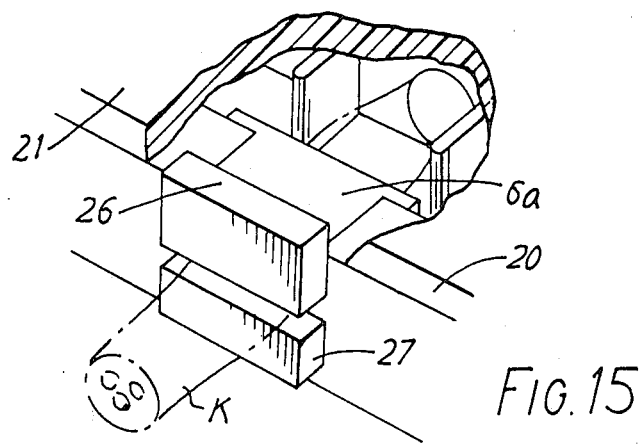
FIG. 15 is a partial perspective view, with parts broken away and in section, showing the strain relief of FIG. 6 embracing and gripping the three-core cable and clamped in the assembled connector.

The strain relief, see FIGS. 6 to 9, again comprises a body made as an integral whole of a resiliently deformable plastic or elastomeric substance, e.g. by molding. The body comprises a first main portion 1a and a second auxiliary portion 2a joined by a flexible laterally bowed strap 3a. The main portion 1a comprises a first elongated rib 4a, a second parallel elongated rib 5a spaced from the first rib by a web 6a, and a trough 7a. The rib 4a is extended at both ends by small lugs 8a, 8a which, when the strain relief is assembled with the two-part connector, as seen in FIGS. 13-15, abut the adjacent major internal surface of the connector to prevent outward movement of the strain relief as a whole under the effect of tension exerted on the gripped cable.

The auxiliary portion 2a comprises a base 13a elongated in the direction of the wires or cable and joined to the strap 3a, and an elongated transverse wall 14a disposed intermediate the ends of the base 13a. The base 13a is plane on its upper face (in FIG. 8) but is curved at its underside, as at 13' with a radius of curvature approximately corresponding to that of the hole in the connector in which it is engaged. A plurality of V-shaped recesses 15a bounding keying ribs 15b are formed in the longitudinal edges of the base 13a, for a purpose to be described below. The wall 14a is cut away at its upper face (in FIG. 8) to provide an elongated recess 16a bounded at each end by an upstanding portion 17a, 17a. The elongation of the recess is made sufficient to receive, say, three wires laid side by side, or a flattened three-core cable.

Figure 10:
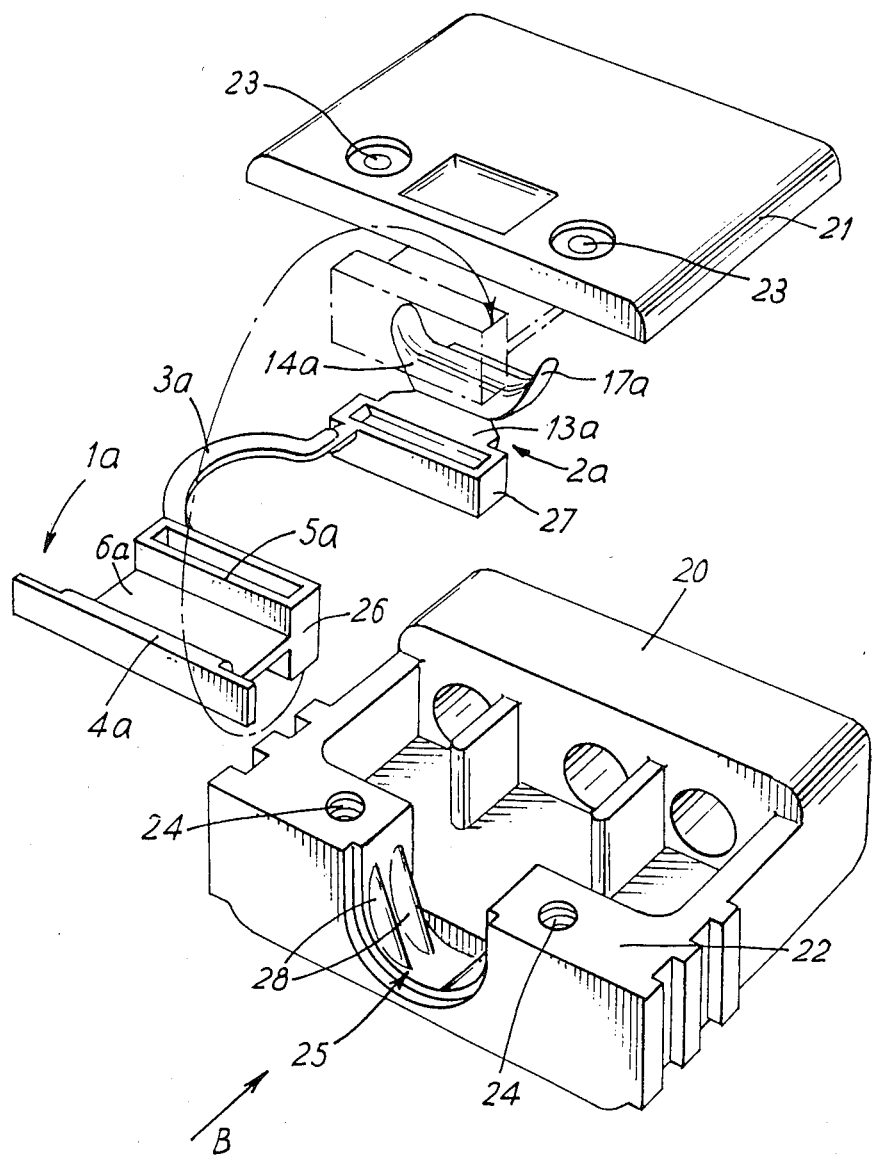
FIG. 10 is a perspective view, with the various parts shown in separated condition, of the strain relief of FIG. 6 and a two-part connector with which it is adapted to be assembled.
Figure 11:
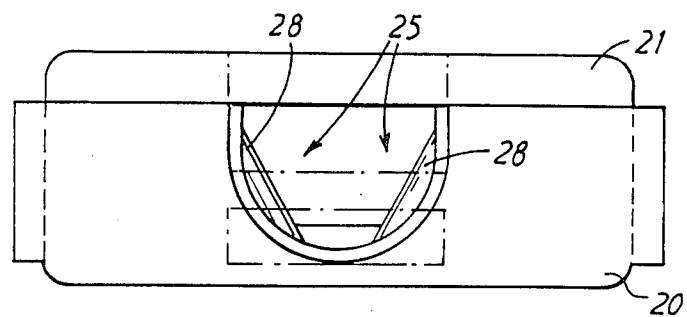
FIG. 11 is an end elevation of the lower part of the connector, viewed in the direction of the arrow "B" in FIG. 10.
Figure 12:
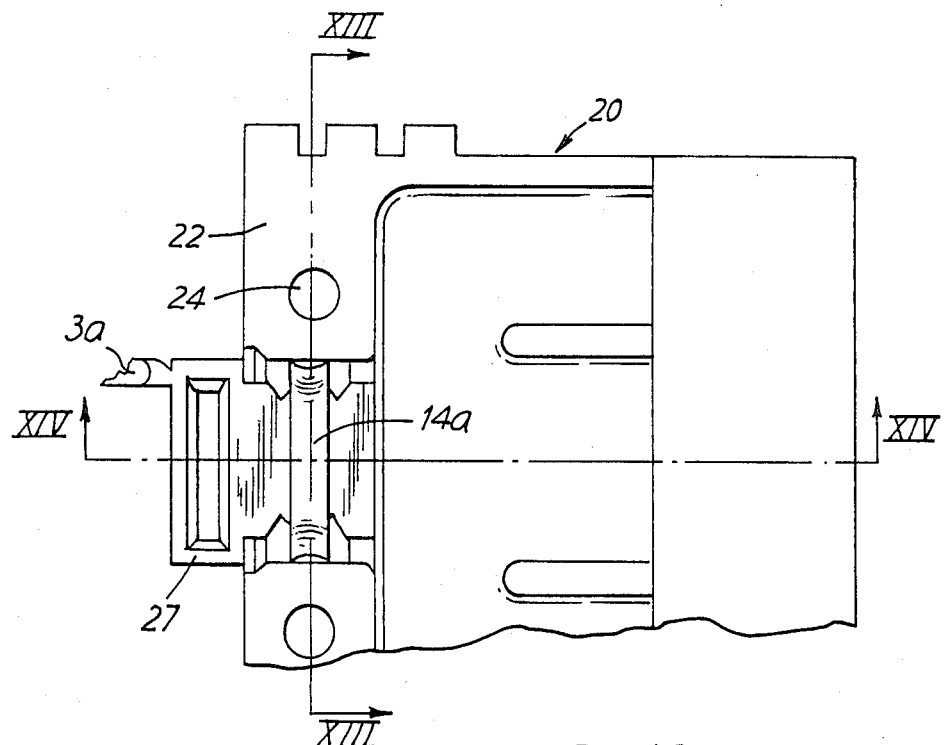
FIG. 12 is a plan view of the lower part of the connector, with one portion of the strain relief in position therein.

Referring now to FIGS. 10-12, there is shown a two-part connector having a lower or main body portion 20, and an upper plate portion 21 which can be laid onto and secured on an upper surface 22 by means of metal screws 22a engaged through screw holes 23 of the plate 21 and into blind holes 24 of the body 20. When the plate 21 is secured on the lower body 20, they together define a cable-entry hole 25. The boundary of the hole 25 defined by the body 20 is generally part-circular, and the boundary of the hole 25 defined by the plate 21 is plane.

For gripping of a three-core cable, as shown, (or three separate wires laid side by side), the cable "K" is engaged between the main portion 1a and the auxiliary portion 2a of the strain relief, with the cable or wires positioned in the elongated recess 16a and resting on top of the wall 14a of the auxiliary portion 2a, and at the same time abutted by the ribs 4a and 5a of the main portion 1a. The assembly of strain relief, in closed condition, and the cable or wires is then laid into the cable entry hole 25, and the plate 21 is placed onto the surface 22 and is tightened into position with the screws 22a. This tightening forces the cable or wires into an inverted U-bend shape, as best seen in broken line in FIG. 14.

The deformation of the cable, or wires, in this manner places a considerable reactive outward thrust on the ribs 4a and 5a of the main portion 1a, and on the base 13a of the auxiliary portion 2a. At the end of the strain relief which lies within the connector, these thrusts are resisted by abutment of the main portion and the auxiliary portion respectively with the plate 21 at point "X", and with the body 20 at point "Y" (see FIG. 14). Such resistance is not available at the end of the strain relief which lies externally of the cable entry hole 25, and to provide effective support for the respective outer end portions of the main portion and the auxiliary portion there are provided thrust elements. For the main portion 1a, a thrust element 26 is provided near and parallel to the rib 5a and, when in clamped condition, abuts against the end surface of the plate 21 at "P". For the auxiliary portion 2a, a thrust element 27 is provided which, when in clamped position, abuts against the end surface of the body 20, at "Q". This abutting in each case prevents the outward bending of the main and auxiliary portions due to reaction from the cable or wires onto which they are clamped. In practice, the thrust elements 26 and 27 can be hollowed as shown.

To further support the strain relief against axial pull exerted on the cable and tending to pull the strain relief out of the hole 25, the internal curved surface of the body 20 bounding the hole 25 is provided with for example two or three opposed pairs of chordal keying ribs 28 (best seen in FIG. 10) which engage into the V-shaped keying recesses 15a of the auxiliary portion of the strain relief.

To accommodate extra-thick cable or wires in the strain relief, the two portions 20 and 21 of the connector can be left in a slightly separated condition, by not screwing the screws 22a fully home.

I claim:

1. A support and strain relief comprising the combination of a support having an opening and a strain relief to be engaged in the opening of the support, said strain relief being formed of a resiliently deformable material and including a first portion and an integral second portion, said first portion having a web with elongated linear ribs spaced apart in the direction of intended application to a multi-core cable or a plurality of wires disposed side by side, said web and said ribs defining collectively a trough, said second portion having a base elongated in the direction of intended application of the multi-core cable or the plurality of wires disposed side by side and a linear transverse wall upstanding intermediate the ends of the base, whereby a multi-core cable or a plurality of wires disposed side by side when placed between the first portion and the second portion and when abutted under pressure by said web and said ribs and said wall, will be forced into a U-shaped bend and will be tightly held by friction against movement relative to the strain relief, at least one of said first and second portions including lug means extending from a lateral edge thereof for abutment, when in use, against a surface of said support adjacent said opening in which the strain relief is to be engaged, and said support having two separate mating parts which, when assembled, define said opening to receive said strain relief, at least one of said mating parts including said surface for abutment by said lug means on the strain relief to resist the strain relief being separated from the support, and wherein said support has keying ribs and one of said first and second portions has cooperating keying ribs presented at its exterior for engagement with said keying ribs of said support in which the strain relief is to be positioned, thereby to key the strain relief against being pulled out of the support.

* * * * *